(12) United States Patent
Shankara

(10) Patent No.: US 7,899,045 B2
(45) Date of Patent: Mar. 1, 2011

(54) TCP MULTICAST SYSTEM AND METHOD

(75) Inventor: Udaya Shankara, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1048 days.

(21) Appl. No.: 11/450,643

(22) Filed: Jun. 9, 2006

(65) Prior Publication Data

US 2007/0230465 A1    Oct. 4, 2007

(30) Foreign Application Priority Data

Mar. 29, 2006    (IN) .............................. 876DEL2006

(51) Int. Cl.
 *H04L 12/28* (2006.01)
(52) U.S. Cl. ...................... 370/389; 370/235
(58) Field of Classification Search ........................ None
See application file for complete search history.

(56) References Cited

U.S. PATENT DOCUMENTS

| | | | |
|---|---|---|---|
| 2003/0046330 A1* | 3/2003 | Hayes | 709/201 |
| 2004/0202164 A1* | 10/2004 | Hooper et al. | 370/390 |
| 2005/0265308 A1* | 12/2005 | Barbir et al. | 370/351 |

OTHER PUBLICATIONS

PCI Express Base Specification Revision 1.0, Jul. 22, 2002, 428 pgs.
PCI-X Addendum to the PCI Local Bus Specification Revision 1.0a, Jul. 24, 2000 PCI Special Interest Group, 240 pgs.
American National Standard: For Information Technology-Fibre Channel-Physical and Signalling Interface-3 (FC-PH-3), Developed by Incits, 1998, 116 pgs.
Serial AT: High Speed Serialized AT Attachment: Revision 1.0a, Jan. 7, 2003, APT Technologies, Inc., Dell Computer Corporation, IBM Corporation, Intel Corporation, Maxtor Corporation, Seagate Corporation, 311 pgs.
Information Technology—Serial Attached SCSI—1.1 (SAS-1.1), Working Draft American National Standard: Project T10/1601-D Revision 1, Sep. 18, 2003, 464 pgs.
IEEE Std 802.3, Mar. 8, 2002, Revision of IEEE, STD 802.3, 2000 Edition, 802.3: IEEE Standard for Information Technology—Telecommunications and information exchange between systems—Local and metropolitan area networks—Specific requirements, Part 3: Carrier Sense Multiple Access with Collision Detection (CSMA/DC) Access Method and Physical Layer Specifications, 387 pgs.
Serial ATA II: Extensions to Serial ATA 1.0a Revision 1.2, Aug. 27, 2004, 110 pgs.
The ATM Forum Technical Committee, ATM-MPLS Network Interworking, Version 1.0, 23 pgs., Aug. 2001.

* cited by examiner

*Primary Examiner* — Robert W Wilson
(74) *Attorney, Agent, or Firm* — Grossman, Tucker, Perreault & Pfleger, PLLC

(57) ABSTRACT

A method, computer program product, system (including a circuit card), and integrated circuit for identifying a plurality of recipients to receive a single data payload. An identifier concerning each of the plurality of recipients is provided to an offload engine. The single data payload is provided to the offload engine. Each of the plurality of identifiers is paired with the single data payload to form a plurality of addressed data payload. Each of the plurality of addressed data payloads is transmitted.

19 Claims, 6 Drawing Sheets

TCP MULTICAST SYSTEM AND METHOD

CROSS-REFERENCE TO RELATED APPLICATIONS

This application claims priority to serial no. 876/DEL/2006 filed Mar. 29, 2006 in the Indian Patent office.

TECHNICAL FIELD

This disclosure relates to TCP-based data transmission and, more particularly, to TCP-based data transmission to a plurality of clients.

BACKGROUND

Software applications (such as messaging programs and A/V programs) often transmit the same data to several clients using TCP (i.e., transmission control protocol). When transmitting data to multiple clients, the server must establish a unique connection with each of the clients receiving the data. Unfortunately, even though the data being transmitted to each client is identical, the software application must transmit the same data to each client. Therefore, if five data packets are to be sent to each of one hundred clients, the software application would need to transmit a total of five-hundred data packets.

BRIEF DESCRIPTION OF THE DRAWINGS

The details of one or more implementations of this disclosure are set forth in the accompanying drawings and the description below. Other features and advantages will become apparent from the description, the drawings, and the claims.

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims

DETAILED DESCRIPTION OF THE PREFERRED EMBODIMENTS

Figure 1A:
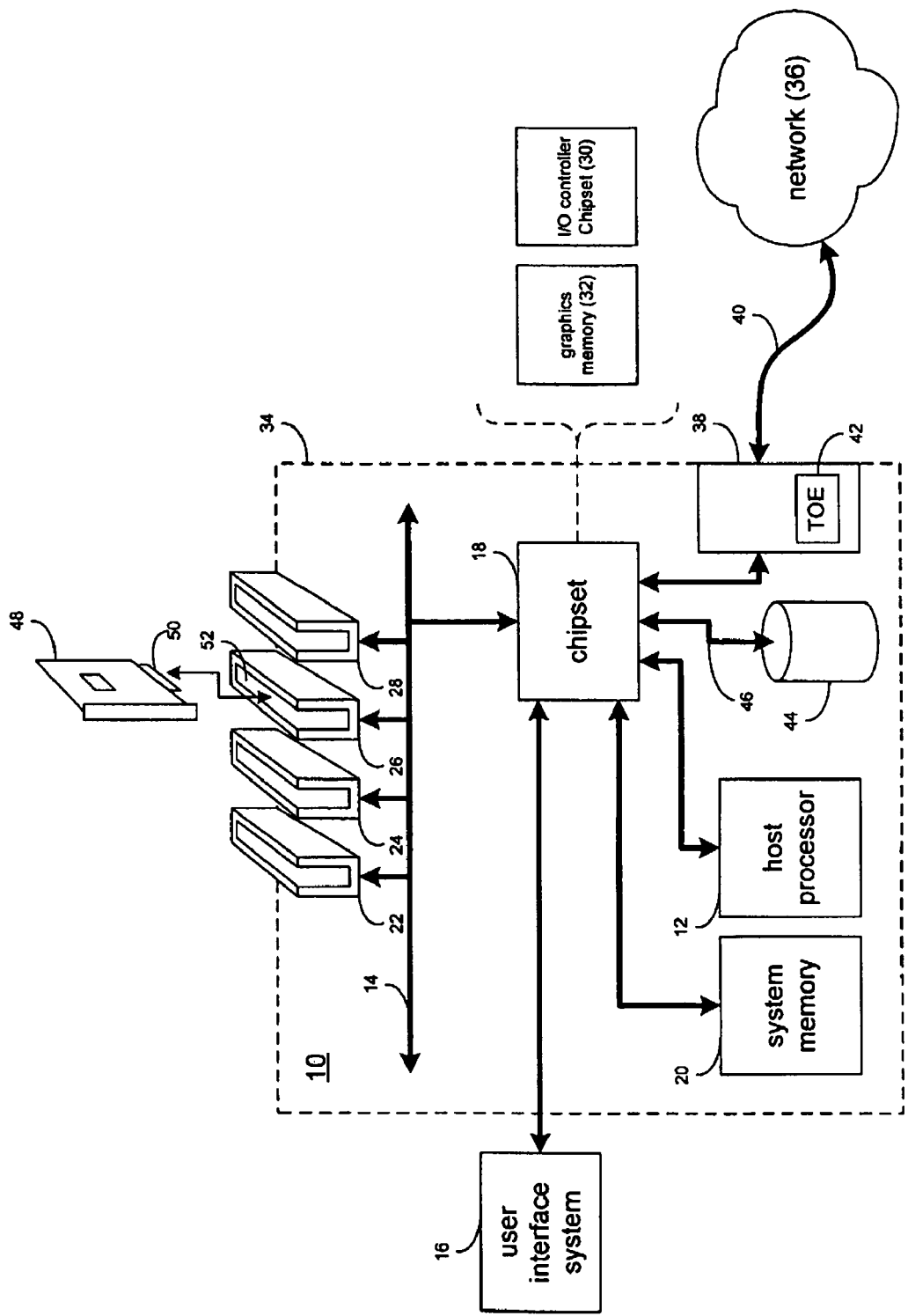
FIG. 1a is a diagrammatic view of a TCP multicast system included within a computer system.

Referring to FIG. 1a, there is shown a computer/server system 10 that may include a host processor 12, a bus 14, a user interface system 16, a chipset 18, system memory 20, and a one or more expansion slots 22, 24, 26, 28.

Host processor 12 may include any variety of processors known in the art such as an Intel® Pentium® IV processor commercially available from the Assignee of the subject application. Bus 14 may include various bus types for transferring data and commands. For example, bus 14 may comply with the Peripheral Component Interconnect (PCI) Express Base Specification Revision 1.0, published 22 Jul. 2002, available from the PCI Special Interest Group, Portland, Oreg., U.S.A. (hereinafter referred to as a "PCI Express™ bus"). Bus 14 may also comply with the PCI-X Specification Rev. 1.0a, 24 Jul. 2000, which is also available from the PCI Special Interest Group, Portland, Oreg., U.S.A.

User interface system 16 may include a variety of devices (e.g., keyboards, pointing devices, video displays, and speaker systems; not shown) for allowing users to provide input/data to and receive output/data from system 10. Chipset 18 may include a host bridge/hub system (not shown) that couples processor 12, user interface system 16, and system memory 20 to each other via bus 14. Chipset 18 may further include one or more integrated circuit chips, such as those commercially available from the assignee of the subject application, examples of which may include I/O controller chipset 30, and graphics memory 32, for example, although additional/other integrated circuit chips may be used. Processor 12, bus 14, chipset 18, system memory 20, and expansion slots 22, 24, 26, 28 may be integrated onto one circuit board (e.g. system board 34).

Chipset 18 may include one or more integrated circuits (e.g., I/O controller chipset 30) for receiving data from and/or providing data to an external network 36 (e.g., the Internet, a local area network, and/or a wide area network, for example) using at least one of a plurality of communication protocols (e.g., internet protocol, hypertext transfer protocol, file transfer protocol, for example). Chipset 18 may be connected to network 36 via a network interface card (NIC) 38 and an external cable 40 that is connected to a network device (e.g., a switch or a router; not shown). NIC 38 may include circuitry (not shown) and firmware (not shown) configured to function as a TCP accelerator/offload engine (TOE) 42. TOE 42 may allow for the acceleration of TCP/IP processing, in that by moving TCP/IP processing from host processor 12 to a separate dedicated sub-system (e.g., TOE 42 within NIC 38), overall TCP/IP performance may be improved.

Chipset 18 may include one or more integrated circuits (e.g., I/O controller chipset 30) for receiving data from and/or providing data to a storage device 44 (e.g., a hard drive, an optical drive, a RAID array and/or a tape drive, for example) using at least one of a plurality of communication protocols (e.g., SATA "Serial Advanced Technology Attachment" protocol; PATA "Parallel Advanced Technology Attachment" protocol; SCSI "Small Computer System Interface" protocol; FC "Fibre Channel" protocol; and SAS-SSP "Serial Attached Small Computer System Interface" protocol, for example).

The FC protocol may comply with or be compatible with the protocol described in "ANSI Standard Fibre Channel Physical and Signaling Interface-3 X3.303:1998 Specification."

The SATA protocol may comply with or be compatible with the protocol described in "Serial ATA: High Speed Serialized AT Attachment," Revision 1.0a, published on Jan. 7, 2003 by the Serial ATA Working Group and/or the protocol described in "Serial ATA II: Extensions to Serial ATA 1.0a," Revision 1.2, published Aug. 27, 2004 by the Serial ATA Working Group and/or earlier and/or later published versions of the SATA standard.

The SAS-SSP protocol may comply with or be compatible with the protocol described in "Information Technology—Serial Attached SCSI—1.1," Working Draft American National Standard of International Committee For Information Technology Standards (INCITS) T10 Technical Committee, Project T10/1562-D, Revision 1, published Sep. 18, 2003, by American National Standards Institute (hereinafter termed the "SAS Standard") and/or earlier and/or later published versions of the SAS Standard.

Chipset 18 may be coupled to storage device 44 via data cable 46, examples of which include a SATA cable, a PATA cable, a fibre cable and/or a SCSI cable.

Expansion card 48 (e.g., video cards, hard drive controllers, and network interface cards, for example) may be configured to be removably inserted into an expansion slot (e.g., expansion slots 22, 24, 26, 28, for example). When expansion card 48 is properly inserted into an expansion slot, connectors 50, 52 (incorporated into expansion card 48 and expansion slot 26 respectively) become electrically and mechanically coupled to each other. When connectors 50, 52 are so coupled to each other, expansion card 48 becomes electrically coupled to bus 14 and may exchange data and/or commands with host processor 12, user interface system 16, and/or system memory 20 (via bus 14 and chipset 18). Alternatively and without departing from this embodiment, the operative circuitry of expansion card 48 may be incorporated into other structures, systems and/or devices (e.g., system board 34). As used in any embodiment herein, "circuitry" may comprise, for example, singly or in any combination, hardwired circuitry, programmable circuitry, state machine circuitry, and/or firmware that stores instructions executed by programmable circuitry.

Figure 1B:
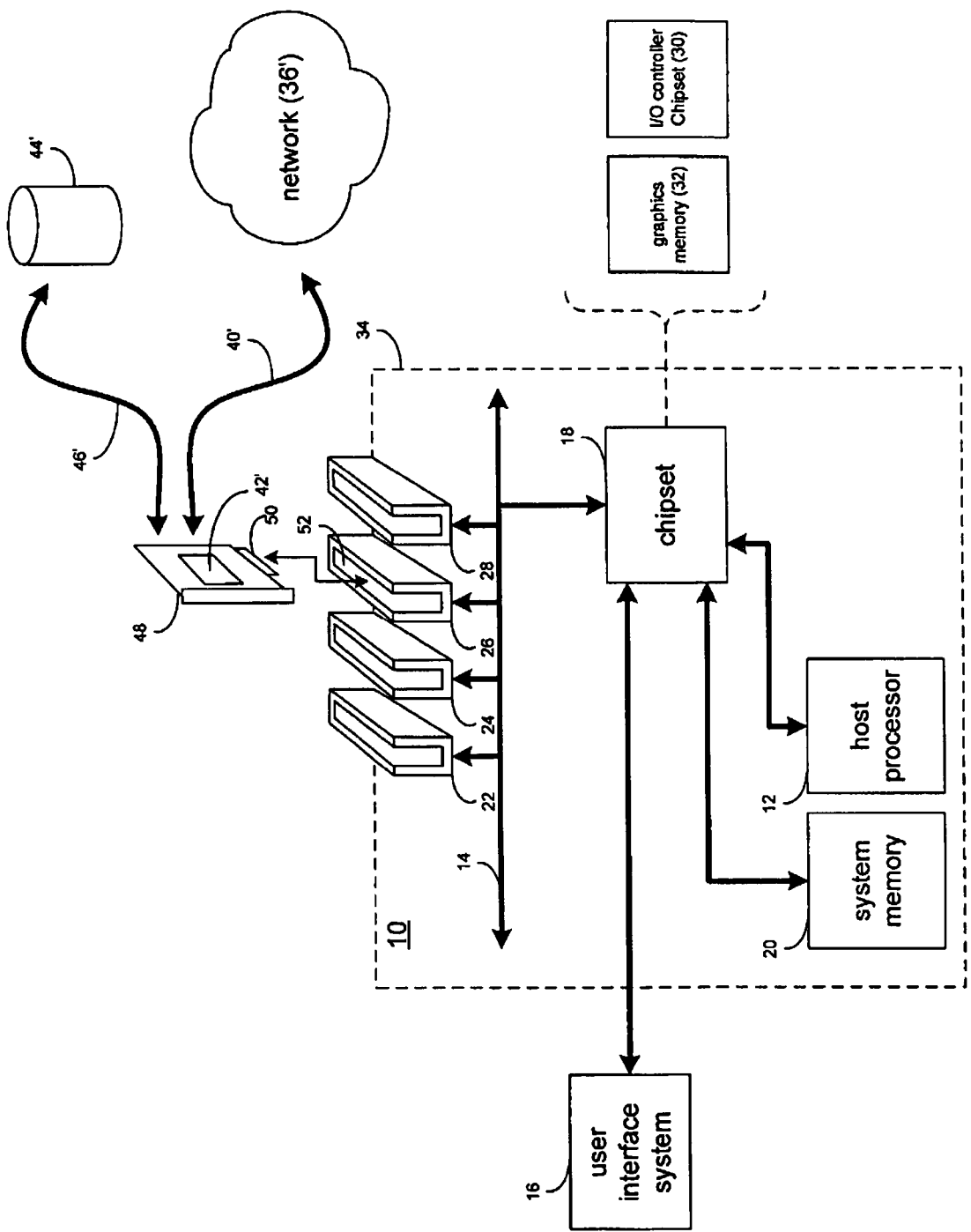
FIG. 1b is a diagrammatic view of an alternative embodiment of the TCP multicast system of FIG. 1.

Referring also to FIG. 1b, as discussed above, expansion card 48 may be e.g., a network interface card (NIC), a hard drive controller card, or a video card, for example. Accordingly, expansion card 48 may include integrated circuit chips (not shown) for receiving data from e.g., an external network 36' (which may comprise, for example, the Internet, a local area network, or a wide area network) using one of many protocols (e.g., internet protocol, hypertext transfer protocol, file transfer protocol, for example). Expansion card 48 may be connected to network 36' via an external cable 40' that is connected to a network device (e.g., a switch or a router; not shown). Expansion card 48 may include circuitry (not shown) and firmware (not shown) configured to function as a TCP accelerator/offload engine (TOE) 42'. TOE 42' may allow for the acceleration of TCP/IP processing, in that by moving TCP/IP processing from host processor 12 to a separate dedicated sub-system (e.g., TOE 42' within expansion card 48), overall TCP/IP performance may be improved.

Alternatively/additionally and for further exemplary purposes, expansion card 48 may include integrated circuit chips (not shown) for receiving data from e.g., storage device 44', which may be located within system 10 or external to system 10. Examples of storage device 44' may include a hard drive, an optical drive, a RAID array and/or a tape drive, for example) using at least one of a plurality of communication protocols (e.g., SATA protocol, PATA protocol, SCSI protocol, FC protocol and SAS-SSP protocol, for example). Expansion card 48 may be coupled to storage device 44' via data cable 46', examples of which include a SATA cable, a PATA cable, a fibre cable and/or a SCSI cable.

Network 36, 36' may comprise a packet switched network. System 10 may be capable of communicating with one or more external devices 100, 102, 104, 106, 108, 110 and/or 112 using a selected packet switched network communications protocol. One exemplary communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

Alternative/additionally, system 10 may be capable of communicating with one or more external devices 100, 102, 104, 106, 108, 110 and/or 112 using an X.25 communications protocol. The X.25 communications protocol may comply or be compatible with a standard promulgated by the International Telecommunication Union-Telecommunication Standardization Sector (ITU-T). Alternatively or additionally, integrated circuit may be capable of communicating with one or more external devices 104, 106 and/or 108 using a frame relay communications protocol. The frame relay communications protocol may comply or be compatible with a standard promulgated by Consultative Committee for International Telegraph and Telephone (CCITT) and/or the American National Standards Institute (ANSI).

Alternatively/additionally, system 10 may be capable of communicating with one or more external devices 100, 102, 104, 106, 108, 110 and/or 112 using an Asynchronous Transfer Mode (ATM) communications protocol. The ATM communications protocol may comply or be compatible with an ATM standard published by the ATM Forum titled "ATM-MPLS Network Interworking 1.0" published August 2001, and/or later versions of this standard. Of course, different and/or after-developed communication protocols are equally contemplated herein.

Figure 2:
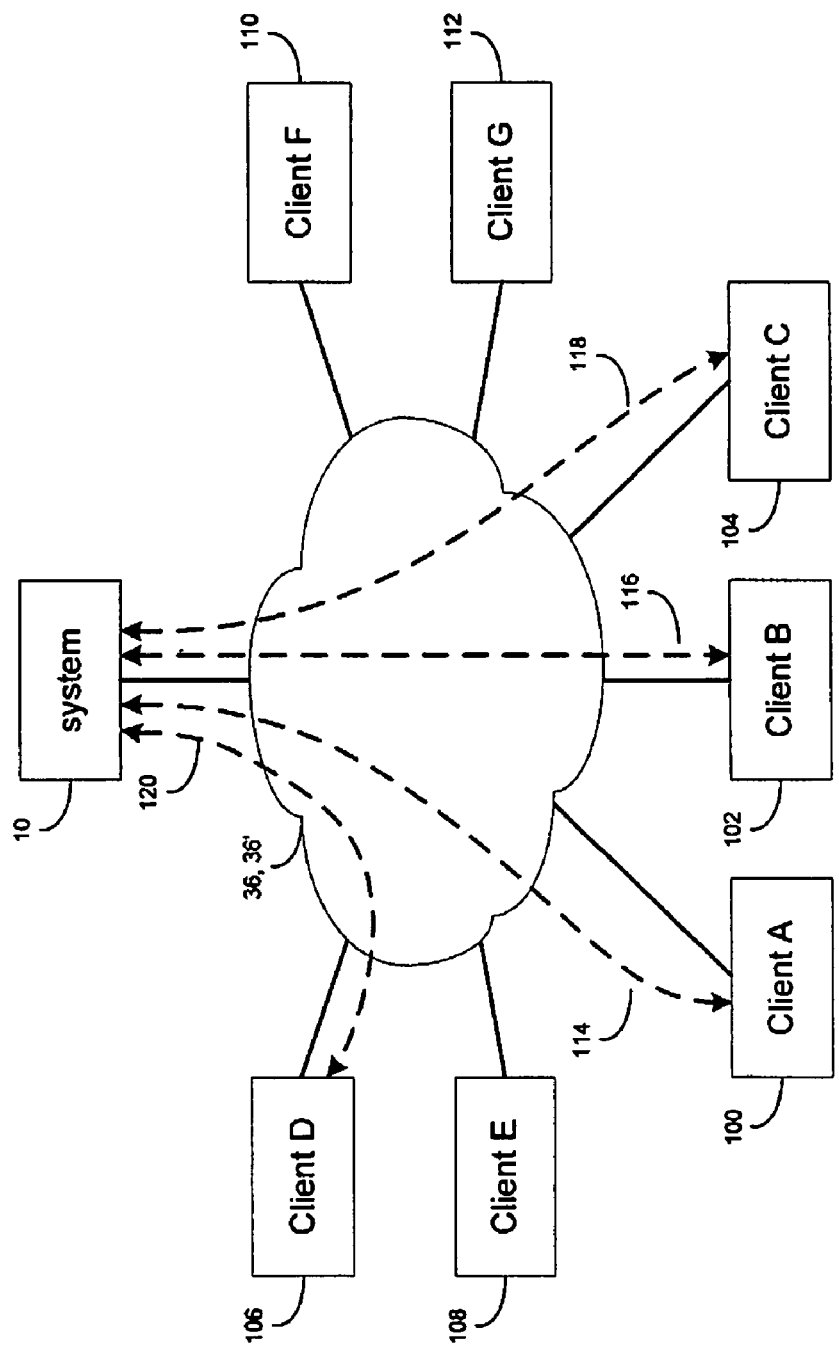
FIG. 2 is a diagrammatic view of a network and a plurality of computer system coupled to the network.

Referring also to FIG. 2, network 36, 36' may couple system 10 with one of more computer systems 100, 102, 104, 106, 108, 110, 112. As will be discussed below in greater detail, system 10 my execute one or more applications that allow/require system 10 to establish connections with one or more of computer systems 100, 102, 104, 106, 108, 110, 112. Examples of such applications include web server applications (e.g., Microsoft IIS™, Apache Web Server™), messaging applications (e.g., Yahoo Messenger™, AOL Instant Messenger™, MSN Messenger™), and streaming audio/video applications. For example, if system 10 is providing streaming video to computer systems 100, 102, 104, a connection (e.g., a TCP connection established using a socket API call) 114, 116, 118 may be established between system 10 and systems 100, 102, 104 (respectively). The instruction sets and subroutines of the applications executed by system 10 may be stored on a storage device (e.g., storage device 44, 44') coupled to system 10 and executed by one or more processors (e.g., processor 12) and one or more memory architectures (e.g., system memory 20) incorporated within system 10.

Figure 3:
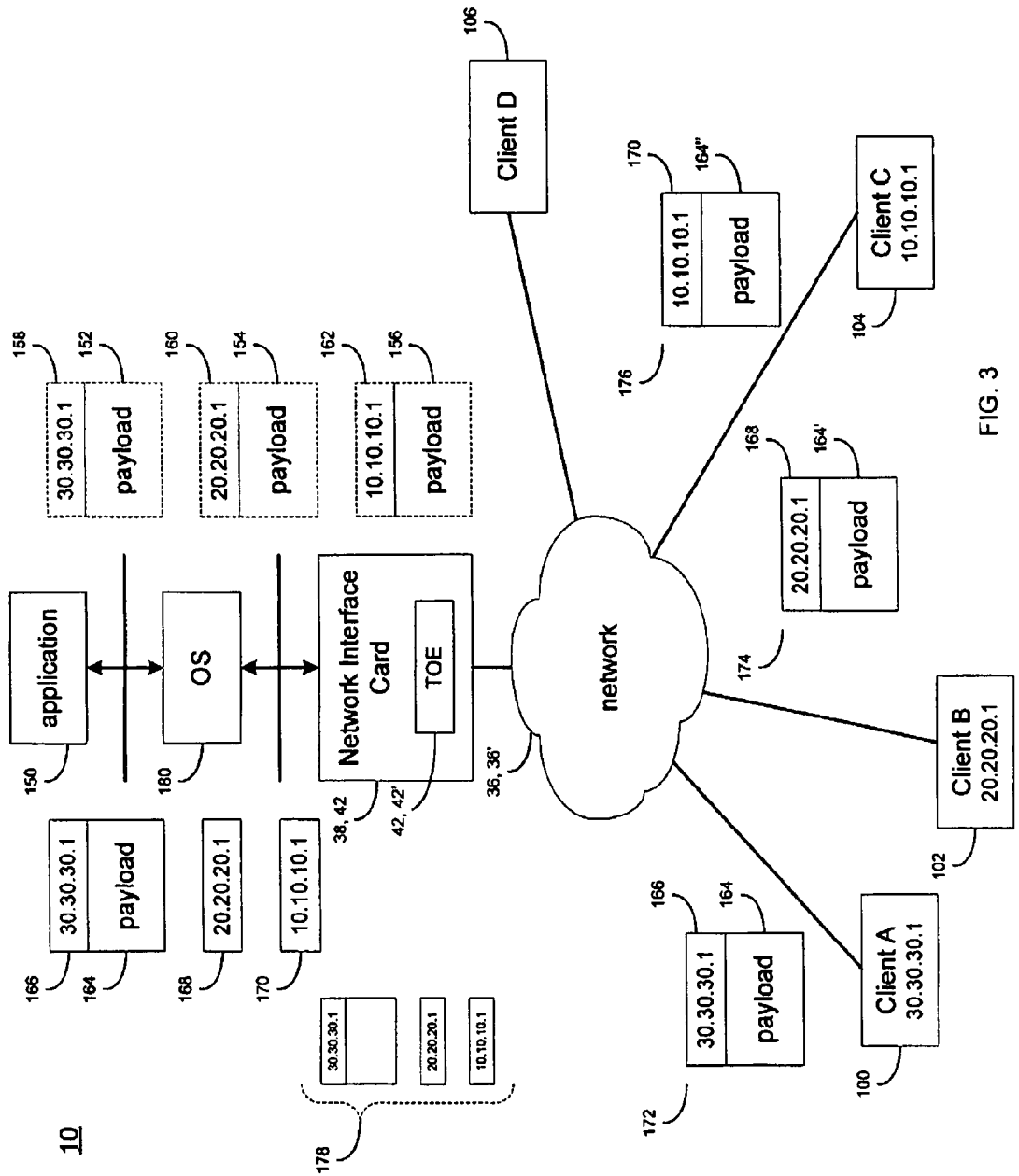
FIG. 3 is a more-detailed diagrammatic view of the TCP multicast system of FIG. 1.

Referring also to FIG. 3, when an application (such as a web server application, a messaging application, and/or a streaming audio/video application) transmits data to a plurality of users (e.g., systems 100, 102, 104), the data transmitted to each system may be identical. For example, if application 150 is an audio/video streaming application that is streaming e.g., a sporting event to a plurality of users (e.g., systems 100, 102, 104), the data being transmitted to each of systems 100, 102, 104 may be identical. Unfortunately, in traditional data distribution systems, when transmitting data to a recipient, a unique connection is established for each recipient (e.g., connections 114, 116, 118; FIG. 2) and an identical copy of the data is transmitted to the recipient. Accordingly, if a connection is established with three recipients (e.g., recipients 100, 102, 104) and each is to receive an identical one megabyte file, system 10 and/or application 150 may be required to transmit three identical copies of the same one megabyte file (represented as payloads 152, 154, 156; shown in phantom) to each of the three recipients (e.g., systems 100, 102, 104). Each identical payload may be addressed to the intended recipient using unique header information (e.g., headers 158, 160, 162; shown in phantom).

However, data transmission efficiency may be enhanced by configuring application 150 and/or one or more circuits within system 10 to offload the payload replication/transmission process(es) described above to TOE 42, 42'.

Figure 4:
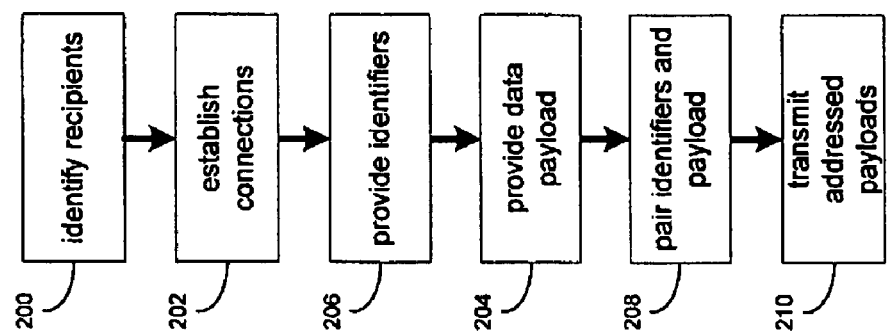
FIG. 4 is a flowchart of a process executed by the TCP multicast system of FIG. 1.

Referring also to FIG. 4, application 150 may be configured to identify 200 a plurality of recipients to receive a common data payload 164., thus defining a group (not shown) of intended recipients. As discussed above, the above-described connections may include TCP connections established using socket API calls. Accordingly, the group of intended recipients may be defined by saving the socket descriptors (on e.g., system memory 20, FIG. 1) that define each connection. The process of storing and maintaining the group of intended recipients (generally) and the socket descriptors that define the group (specifically) may be handled by application 150 and/or OS 180.

Common data payload 164 may be representative of an entire data file or only a portion (e.g., a data packet) of a data file. For example, assume that application 150 is a audio/video streaming application that is configured to provide a "live" A/V data stream of a baseball game to viewers. Assume that prior to game time, three users (represented by systems 100, 102, 104) access system 10 (via a website; not shown) and perform one or more steps (e.g., logging in, joining a service, and/or downloading an applet, for example) required to receive the A/V stream. Accordingly, in the above-stated example, the plurality of recipients includes there recipients (e.g., systems 100, 102, 104) having IP addresses 30.30.30.1, 20.20.20.1, and 10.10.10.1 respectively. During this recipient identification procedure, a connection may be established 202 between system 10 and each one of the recipients. For example, connection 114 (FIG. 2) may be established between system 10 and system 100; connection 116 (FIG. 2) may be established between system 10 and system 102; and connection 118 (FIG. 2) may be established between system 10 and system 104.

Once the transmission of data commences, a single copy of common data payload 164 may be provided 204 (via operating system 180) to TOE 42, 42'. As discussed above, TOE 42, 42' may be embedded within network interface card 38, 48. Once common data payload 164 is received by TOE 42, 42', common data payload 164 may be stored in one or more buffers (not shown) included within/controlled by TOE 42, 42'.

In addition to common data payload 164, one or more identifiers may be provided 206 to TOE 42, 42' that define the intended recipients of common data payload 164. Being, in this example, the intended data recipients are system 100, 102, 104, identifiers 166, 168, 170 are provided to TOE 42, 42'. Identifiers may be headers that define e.g., the IP (internet protocol) address of the intended recipient or some socket identifier that was assigned at the time of opening the TCP connection. In this particular example, identifier 166 corresponds to system 100; identifier 168 corresponds to system 102; and identifier 170 corresponds to system 104.

When common data payload 164 is provided to TOE 42, 42', common data payload 164 may be attached to one or more identifiers 166, 168, 170 (as shown in FIG. 3). Alternatively, common data payload 164 may be provided to TOE 42, 42' as an individual file. For example, application 150 may provide common data payload 164 to TOE 42, 42' as a stand-alone data element (i.e., absent an identifier).

Upon receiving identifiers 166, 168, 170, TOE 42, 42' pairs 208 common data payload 164 with each of the identifiers 166, 168, 170 to form a plurality of addressed data payloads 172, 174, 176. Each of the addressed data payloads 172, 174, 176 comprises a copy of common data payload 164 and one of identifiers 166, 168, 170. Each addressed data payload 172, 174, 176 may then be transmitted 210 to each intended recipient (e.g., system 100, 102, 104).

As discussed above, when providing common data payload 164 to TOE 42, 42', common data payload 164 may be paired with an identifier, as shown in FIG. 3 in which identifier 166 is paired with payload 164. In this situation, a copy of common data payload 164 is copied into one or more buffers (not shown) included within/controlled by TOE 42, 42' (as discussed above). Common data payload 164/identifier 166 may then be transmitted 210 to its intended recipient (i.e., system 100) as addressed data payload 172. Identifiers 168 may be paired 208 with a copy 164' of common data payload 164 to form addressed data payload 174, and identifier 170 may be paired 208 with a copy 164" of common data payload 164 to form addressed data payload 176.

Once common data payload 164 is transmitted 210 to all intended recipients, the buffers (not shown) included within/controlled by TOE 42, 42' may be cleared, thus erasing common data payload 164. However, since TCP guarantees reliable delivery of data, if a segment is lost in transmission, the TCP may retransmit the data block. Accordingly, the buffered packet within TOE 42, 42' may not be deleted immediately after sending the packet to all recipients, as the TOE may buffer the packet until it receives a receipt acknowledgement from all of the recipients.

In the event that the total amount of data to be received by the recipients (e.g., system 100, 102, 104) exceeds the maximum data quantity of common data payload 164, the data may be provided to the recipients in multiple portions. For example, the maximum data quantity of common data payload 164 may be a 1024 byte packet of data. For a streaming A/V broadcast, thousands of data packets may be transmitted to the plurality of recipients. Accordingly, after common data payload 164 is transmitted to all of the intended recipients, additional common data payloads and identifiers 178 may be provided 204, 206 to TOE 42, 42' for subsequent pairing 208 and transmission 210 to intended recipients 100, 102, 104.

In the event that additional recipients (e.g., system 106) are identified 200 for receiving common data payload 164, additional identifiers (not shown) may be provided to TOE 42, 42' and additional addressed data payloads (not shown) may be generated and provided to the additional recipients. For example, if during third inning of the above-described baseball game, a new user wishes to watch/listen to the data stream of the game, a connection 120 (FIG. 2) may be established with system 106, thus expanding the group (not shown) of intended recipients described above. Accordingly, additional socket descriptors may be added to define the additional recipients. When the next common data payload is provided 204 to TOE 42, 42', an additional identifier (not shown) identifying system 106 by e.g., an IP address may be provided 206 to TOE 42, 42'. Accordingly, the additional identifier (identifying system 106) may be paired 208 with the next common data payload provided 204 to TOE 42, 42' and an addressed data payload (not shown) may be transmitted 210 to system 106.

Figure 5:
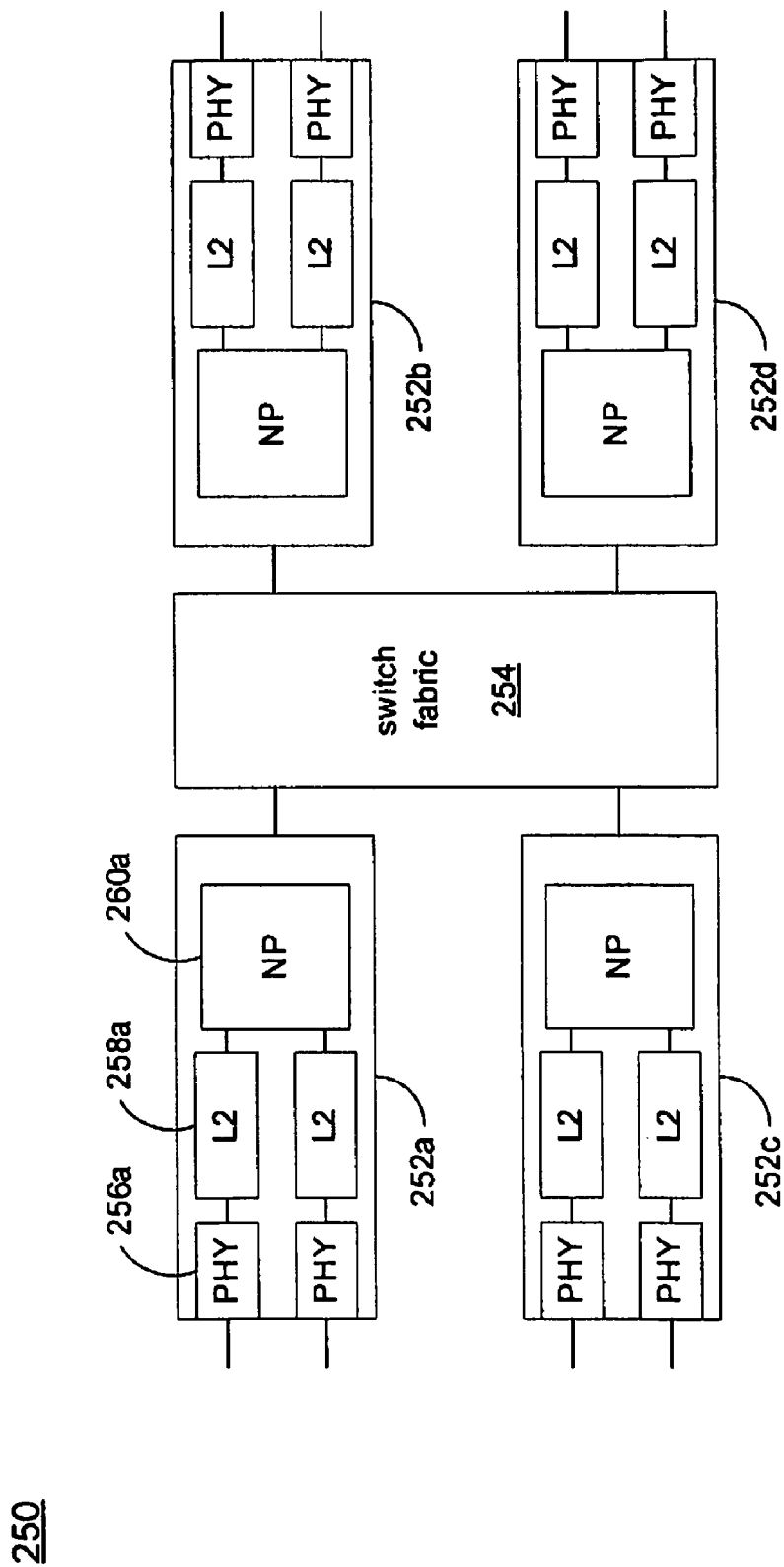
FIG. 5 is a diagrammatic view of another embodiment of the TCP multicast system of FIG. 1.

Referring also to FIG. 5, there is shown another system embodiment 250 of TOE 42, 42'. This embodiment features a collection of line cards 252a, 252b, 252c and 252d ("blades") interconnected by a switch fabric 254 (e.g., a crossbar or shared memory switch fabric). The switch fabric 254, for example, may conform to CSIX or other fabric technologies such as HyperTransport, Infiniband, PCI-X, Packet-Over-SONET, RapidIO, and Utopia.

Individual line cards (e.g., 252a) may include one or more physical layer (PHY) devices 256a (e.g., optic, wire, and wireless PHYs) that handle communication over network connections. The PHYs may translate between the physical signals carried by different network mediums and the bits (e.g., "0"-s and "1"-s) used by digital systems. The line cards may also include framer devices 258*a* (e.g., Ethernet, Synchronous Optic Network (SONET), High-Level Data Link (HDLC) framers or other "layer 2" devices) that can perform operations on frames such as error detection and/or correction. The line cards shown may also include one or more integrated circuits 260*a,* which may include network processors, and may be embodied as integrated circuit packages (e.g., ASICs). In addition to the operations described above with reference to TOE 42, 42', in this embodiment TOE 42, 42' may also perform packet processing operations for packets received via the PHY(s) 256*a* and direct the packets, via the switch fabric 254, to a line card providing the selected egress interface. Potentially, the TOE 42, 42' may perform "layer 2" duties instead of the framer devices 258*a.*

In any embodiment described herein, the techniques may be implemented in other hardware, firmware, and/or software. For example, the techniques may be implemented in integrated circuits (e.g., Application Specific Integrated Circuits (ASICs), Gate Arrays, and so forth). Additionally, the techniques may be applied to a wide variety of networking protocols at different levels in a protocol stack and in a wide variety of network devices (e.g., a router, switch, bridge, hub, traffic generator, and so forth).

While expansion card 48 is described above as being configured to be coupled with system 10, other configurations are possible and are considered to be within the scope of this disclosure. For example, expansion card 48 may be configured to be coupled with a switching fabric (not shown). A switching fabric may include hardware and software and may be configured to receive data on a network node and transmit the data though the appropriate network port. The switching fabric may include one or more switching units in a node and the programming required to perform the above-described functionality.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A method of providing multicast-like TCP-based data transmission, the method comprising:

identifying a plurality of recipients to receive a single data payload using computer systems;

establishing a TCP connection with the computer systems of each of the plurality of recipients;

providing a plurality of TCP/IP packets to an offload engine of a transmitting computer system, wherein each of the TCP/IP packets includes an identifier defining an IP address of one of the plurality of recipients, and wherein one of the TCP/IP packets includes the single data payload with the identifier and the others of the TCP/IP packets include the identifiers without the single data payload;

processing the plurality of TCP/IP packets in the offload engine such that each of the plurality of identifiers in the TCP/IP packets without the payload is paired with the single data payload to form a plurality of full TCP/IP packets including addressed data payloads; and transmitting each of the full TCP/IP packets from the transmitting computer system over the respective TCP connections to the respective computer systems of the recipients.

2. The method of claim 1 wherein at least one identifier includes header information that identifies one or more of the plurality of clients.

3. The method of claim 1 wherein the offload engine includes a TCP offload engine.

4. The method of claim 3 wherein the TCP offload engine is executed by a network interface card.

5. The method of claim 1 wherein the TCP connections are established using socket API calls, wherein socket descriptors defining each of the TCP connections are saved to define the recipients, and wherein providing the plurality of TCP/IP packets to the offload engine includes sending the single data payload on only one of the socket descriptors for the recipients.

6. The method of claim 1 wherein processing the plurality of TCP/IP packets in the offload engine includes buffering the single data payload and constructing the full TCP/IP packets using the buffered single data payload.

7. A non-transitory computer readable medium having a plurality of instructions stored thereon which when executed by a processor, cause the processor to perform operations comprising:

receiving a plurality of TCP/IP packets, wherein each of the TCP/IP packets includes an identifier defining an IP address of one of a plurality of recipients to receive a single data payload, and wherein one of the TCP/IP packets includes the single data payload with the identifier and the others of the TCP/IP packets include the identifiers without the single data payload;

processing the plurality of TCP/IP packets such that each of the plurality of identifiers in the TCP/IP packets without the payload is paired with the single data payload to form a plurality of full TCP/IP packets including addressed data payloads; and transmitting each of the full TCP/IP packets over TCP connections to the respective recipients.

8. The computer program product of claim 7 wherein at least one identifier includes header information that identifies one or more of the plurality of clients.

9. The computer program product of claim 7 wherein the TCP connections are established using socket API calls.

10. The computer program product of claim 7 wherein processing the plurality of TCP/IP packets includes buffering the single data payload and constructing the full TCP/IP packets using the buffered single data payload.

11. An apparatus comprising:

circuitry configured to receive a plurality of TCP/IP packets, wherein each of the TCP/IP packets includes an identifier defining an IP address of one of a plurality of recipients to receive a single data payload, and wherein one of the TCP/IP packets includes the single data payload with the identifier and the others of the TCP/IP packets include the identifiers without the single data payload;

circuitry configured to process the plurality of TCP/IP packets such that each of the plurality of identifiers in the TCP/IP packets without the payload is paired with the single data payload to form a plurality of full TCP/IP packets including addressed data payloads; and circuitry configured to transmit each of the full TCP/IP packets over TCP connections to the respective recipients.

12. The apparatus of claim 11 wherein at least one identifier includes header information that identifies one or more of the plurality of clients.

13. The apparatus of claim 11 wherein the TCP connections are established using socket API calls.

14. The apparatus of claim 11 wherein processing the plurality of TCP/IP packets includes buffering the single data payload and constructing the full TCP/IP packets using the buffered single data payload.

15. A system comprising:
- a plurality of line cards, an individual line card comprising a TCP offload engine configured for:
  - receiving a plurality of TCP/IP packets, wherein each of the TCP/IP packets includes an identifier defining an IP address of one of a plurality of recipients to receive a single data payload, and wherein one of the TCP/IP packets includes the single data payload with the identifier and the others of the TCP/IP packets include the identifiers without the single data payload;
  - processing the plurality of TCP/IP packets such that each of the plurality of identifiers in the TCP/IP packets without the payload is paired with the single data payload to form a plurality of full TCP/IP packets including addressed data payloads; and
  - transmitting each of the full TCP/IP packets over TCP connections to the respective recipients; and
- a switch fabric interconnecting the plurality of line cards.

16. The system of claim 15 wherein at least one identifier includes header information that identifies one or more of the plurality of clients.

17. The system of claim 15 wherein the individual line card comprising the TCM offload engine is a network interface card.

18. The system of claim 15 wherein the TCP connections are established using socket API calls.

19. The system of claim 15 wherein processing the plurality of TCP/IP packets includes buffering the single data payload and constructing the full TCP/IP packets using the buffered single data payload.

* * * * *